United States Patent
Anderson et al.

(10) Patent No.: US 8,185,398 B2
(45) Date of Patent: May 22, 2012

(54) READING DEVICE WITH SHORTCUT READ FUNCTION

(75) Inventors: Gretchen Anderson, San Francisco, CA (US); Jeff Witt, Baltimore, MD (US); Ben Foss, San Francisco, CA (US); J M Van Thong, Arlington, MA (US)

(73) Assignee: Intel-GE Care Innovations LLC, Roseville, CA (US)

( * ) Notice: Subject to any disclaimer, the term of this patent is extended or adjusted under 35 U.S.C. 154(b) by 1179 days.

(21) Appl. No.: 11/967,929

(22) Filed: Dec. 31, 2007

(65) Prior Publication Data
US 2009/0172513 A1   Jul. 2, 2009

(51) Int. Cl.
*G10L 21/00* (2006.01)
*G06F 15/00* (2006.01)

(52) U.S. Cl. ......... 704/270; 704/260; 382/103; 382/114

(58) Field of Classification Search .................... 704/270
See application file for complete search history.

(56) References Cited

U.S. PATENT DOCUMENTS

| | | |
|---|---|---|
| 5,875,428 A | 2/1999 | Kurzweil et al. |
| 6,014,464 A | 1/2000 | Kurzweil et al. |
| 6,033,224 A | 3/2000 | Kurzweil et al. |
| 6,035,061 A | 3/2000 | Katsuyama et al. |
| 6,052,663 A | 4/2000 | Kurzweil et al. |
| 6,115,482 A | 9/2000 | Sears et al. |
| 6,173,264 B1 | 1/2001 | Kurzweil et al. |
| 6,199,042 B1 | 3/2001 | Kurzweil et al. |
| 6,246,791 B1 | 6/2001 | Kurzweil et al. |
| 6,289,121 B1 | 9/2001 | Abe et al. |
| 6,320,982 B1 | 11/2001 | Kurzweil et al. |
| 6,587,583 B1 | 7/2003 | Kurzweil et al. |
| 7,123,292 B1 | 10/2006 | Seeger et al. |
| 2003/0063335 A1 | 4/2003 | Mandel et al. |
| 2005/0071167 A1* | 3/2005 | Levin et al. .................. 704/272 |
| 2005/0286743 A1 | 12/2005 | Kurzweil et al. |
| 2005/0288932 A1 | 12/2005 | Kurzweil et al. |
| 2006/0011718 A1 | 1/2006 | Kurzweil et al. |
| 2006/0013483 A1 | 1/2006 | Kurzweil et al. |
| 2007/0230748 A1 | 10/2007 | Foss |
| 2007/0230749 A1 | 10/2007 | Foss |
| 2007/0230786 A1 | 10/2007 | Foss |

(Continued)

FOREIGN PATENT DOCUMENTS

KR   10-2000-0063969 A   11/2000

(Continued)

OTHER PUBLICATIONS

Kochi et al., "User-defined template for identifying document type and extractinginformation from documents", Proceedings of the Fifth International Conference onDocument Analysis and Recognition, ICDAR '99, pp. 127-130, Sep. 20-22, 1999.*

(Continued)

*Primary Examiner* — Justin Rider
(74) *Attorney, Agent, or Firm* — Pillsbury Winthrop Shaw Pittman LLP

(57) ABSTRACT

In some embodiments, a reading device is provided with a shortcut read mode in which a user can instruct the reading device of the type of document (e.g., invoice, package label, newspaper, etc.) that is to be read so that the device can more efficiently find and read back to the user desired (target) information from the document.

22 Claims, 4 Drawing Sheets

U.S. PATENT DOCUMENTS

| | | |
|---|---|---|
| 2007/0280534 A1 | 12/2007 | Foss |
| 2009/0169061 A1 | 7/2009 | Anderson |
| 2009/0169131 A1 | 7/2009 | Nestares |
| 2009/0245695 A1 | 10/2009 | Foss |

FOREIGN PATENT DOCUMENTS

| | | |
|---|---|---|
| KR | 10-2006-0116114 A | 11/2006 |
| WO | 2009006015 | 1/2009 |

OTHER PUBLICATIONS

International Search Report/Written Opinion for Patent Application No. PCT/US2008/067237, mailed Oct. 29, 2008, 10 pages.

* cited by examiner

Template 302

Field 1 $303_1$: Layout Properties; Content Properties; Style Properties; Content Type Properties; Targets; Identification Rules; Read Rules

Field 2 $303_2$: Layout Properties; Content Properties; Style Properties; Content Type Properties; Targets; Identification Rules; Read Rules

...

Field N $303_N$: Layout Properties; Content Properties; Style Properties; Content Type Properties; Targets; Identification Rules; Read Rules Template Rules 305

FIGURE 3

READING DEVICE WITH SHORTCUT READ FUNCTION

BACKGROUND

The embodiments of the invention relate to a reading machine for impaired persons such as individuals who are visually impaired or have dyslexia.

People with disabilities, such as impaired vision or dyslexia, may have difficulty reading printed material. Automatic systems are needed to render documents as audio recordings.

It is known to provide a mobile print digitizer for the visually impaired. One known device captures printed documents and reads them to the user. A camera or scanner captures an image of a printed page, and then runs optical character recognition (OCR) on the image. The output is fed to a speech synthesizer such as a text-to-speech (TTS) system. Unfortunately, existing systems can be inefficient in their ability to allow a user to efficiently navigate a document as the reader reads it to the user. Accordingly, new approaches are desired.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 3 is a diagram generally showing an outline of a shortcut template in accordance with some embodiments.

DETAILED DESCRIPTION

One of the challenges for reading device users is that with some types of text-containing documents, the user may only be interested in reading a portion of the text. Accordingly, with some embodiments, a reading device is provided with a shortcut read mode in which a user can instruct the reading device of the type of document (e.g., invoice, package label, newspaper, etc.) that is to be read so that the device can more efficiently find and read back to the user desired (target) information from the document.

Figure 1:
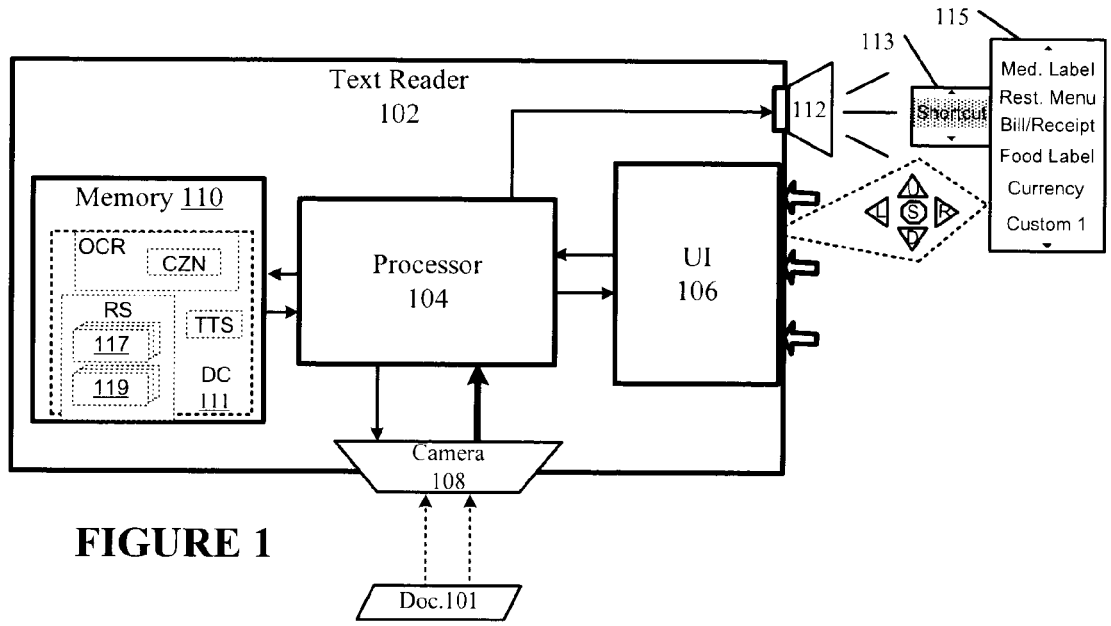
FIG. 1 is a diagram of a reading apparatus in accordance with some embodiments.

FIG. 1 shows a block diagram of a reading apparatus 102 to read to a user a document 101 to be scanned in accordance with some embodiments. Reader 102 generally comprises a processor 104, user interface 106, camera 108, memory 110, and auditory output device 112, coupled together as shown.

The camera may comprise any suitable device such as a charge coupled device (CCD) camera to acquire a raster image of the text document 101, as is known in the art. It may scan a document line by line, section by section or it may image an entire page or sheet at once. Similarly, the document can comprise any material with visual text to be read. This includes, for example, a page, sheet, package surface, slip of paper (as with some receipts), a video screen (e.g., at an airport), or the like.

The auditory device 112 could comprise any suitable device to auditorily convey the read text to the user. For example, it could comprise one or more speakers and/or audio interface ports for connection to headphones or the like.

The user interface 106 may constitute any suitable components, known or not yet developed, to allow a user to conveniently control the reader. For example, the user interface could comprise one or more buttons, wheels, joysticks or other input control components that allow a user to manually control the reader without necessarily being able to see the user interface (i.e. it should allow a user to control at least some of the components with the appropriate feedback mechanism). In some embodiments, the user interface includes a five button interface, such as that shown in FIG. 1, with up ("U"), down ("D"), left ("L"), right ("R"), and select ("S") buttons, to allow a user to conveniently navigate through a document, as addressed more below.

In the depicted embodiment, through auditory device 112, an auditory menu 113 is provided to allow a user to select, among other things, a read shortcut function. A portion of the auditory menu is shown graphically for illustrative purposes but may not be actually visually presented on a device. That is, the user may press a button (e.g., the select button) to have one or more menu options read and select an option or go "down" further (e.g., via a down button) into an option in response to the options being read to the user. (The reading device 102 may or may not include a video screen or other visual output component, e.g., as part of its user interface. On the other hand, in some embodiments, a screen such as a liquid crystal display (LCD) screen may be provided for visual control and/or for document magnification (e.g., for users having at least some vision).

The user interface could also include input ports (which may also function as output ports) such as universal serial bus (USB), so-called "Firewire", and/or wireless ports, e.g., to allow a user to import an electronic document that may or may not be in a text format. For example, portable document format (PDF) documents (or the like) could be imported for auditory reading to a user. In addition, the user interface could include speech-to-text capability, e.g., a microphone with suitable speech-to-text engine. Of course, as with any feature, especially those requiring substantial hardware and/or processing, trade-offs must be made between cost, power consumption, operating efficiency, performance accuracy, and feature capability.

The processor and memory may comprise any suitable combination of memory and processing circuits, components, or combinations of the same to execute routines to control the reader 102. The memory 110 comprises device control (DC) software code 111 to control the reader 102 and execute its various functions. In the depicted embodiment, the device control code has at least several modules including an optical character recognition (OCR) module, a read shortcut (RS) module, and a text-to-speech (TTS) module. The OCR module further includes a characterization (CZN) module, and the read shortcut module includes one or more templates 117 and target filters 119 for the different document types having read shortcut options in the reader 102. There may be more modules and in some embodiments, the modules may not necessarily be related to each other as shown.

The device control code controls scanning (digitized document acquisition), reading navigation, and general system functionality. The OCR module converts the pre-text (e.g., rasterized scanned image) document into text data and characterizes it, using the characterization module, so that it may be read to a user. (As used herein, "reading" means to convey or provide text in an audio form to a user.)

The read shortcut module (e.g., in response to a read shortcut operation being selected by a user) processes the document based on properties and rules defined in a template associated with that document type to "efficiently" read to the user one or more specific targets from the document. In the depicted embodiment, the document types correspond to the different shortcut templates 117 shown within the RS module. That is, a separate template may be used to identify text fields, expected in the document type selected. A filter is then used to identify desired target information from the text fields for reading to the user.

There may be many different types of documents for which read shortcut capability may be desired. For example, submenu 115 shows document type options including medical labels, restaurant menus, bills/receipts, food package labels, currency, and custom types. Others may also be included such as larger document types such as newspapers, magazines, and the like.

The templates and/or filters may be predefined and provided as part of a reading device to a customer. In addition, provisions can be made so that users can create and/or modify templates and/or filters (or acquire them from elsewhere) for different desired document types or so they can control or change how a read shortcut for a document type is to occur (e.g., what targets to look for and/or how to read them). For example, a user might generate a template for a London bus schedule. Tools could be made for users to more conveniently create such custom templates. For example, software could be provided for a user's personal computer to create custom templates and/or filters from scanned documents.

Figure 2:
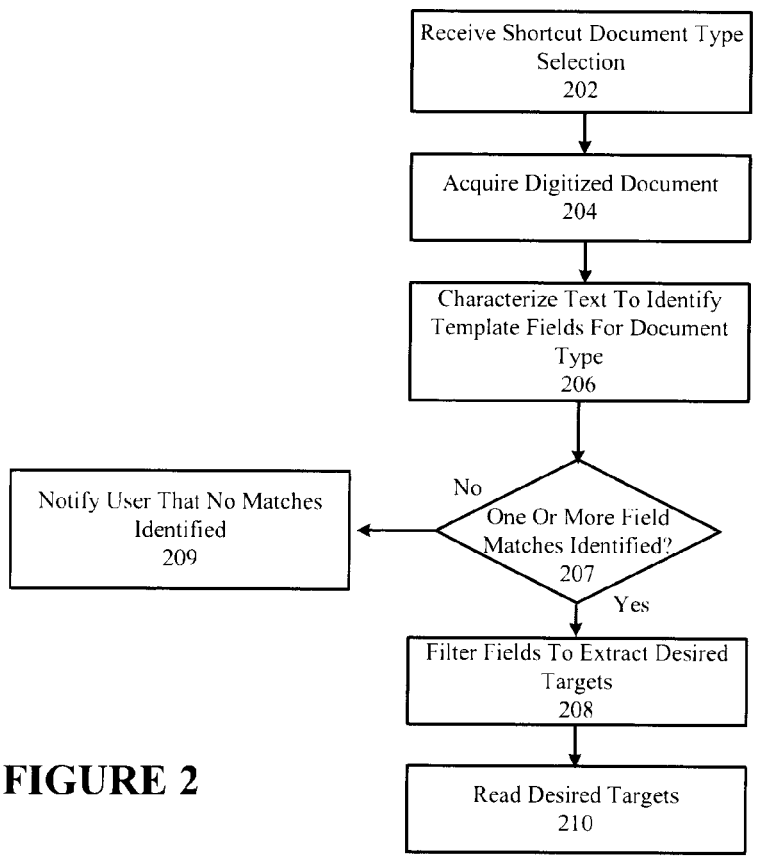
FIG. 2 is a flow diagram of a routine for implementing a shortcut read process in accordance with some embodiments.

FIG. 2 generally shows a routine for implementing a read shortcut routine, e.g., from the RS module of FIG. 1, in accordance with some embodiments. In some embodiments, conventional OCR and TTS modules may be used in cooperation with a CZN module designed, among other things, to perform methods and concepts discussed herein. (This comprises developing an OCR with a suitable characterization capability, appropriately modifying and/or configuring an "off-the-shelf" OCR program to have suitable characterization, or another feasible approach.)

Upon initiation of a read shortcut option at 202, the reader receives (e.g., by eliciting) a document type option for the read shortcut function. With the exemplary user interface of FIG. 1, this could correspond to a user selecting a "shortcut" option and then selecting a particular document type. In some embodiments, the user could go further and select a particular sub option for a given document type. For example, with a given document type, different targets or reading options may be desired.

At 204, the reader (or reading device) initiates document acquisition. The text-containing document may be acquired in various different ways. It could be done through the importation of an electronic document or by scanning a document such as text-containing document 101 using the camera 108. Regardless of how it is acquired, the digitized document file should be in a suitable form for the utilized OCR module. For example, many OCR packages typically accept raster image formats commonly found throughout the document management industry such as TIF, BMP, PCX and DCX, to mention just a few. Depending upon particular design considerations, a suitable OCR solution could also be made to accept input from other sources such as fax input formats, PDF (or similar) formats, or common scanner driver formats such as TWAIN and ISIS.

At 206, text from the acquired document is characterized, based on the template for the selected document type, to identify and characterize fields, as defined in the template. This involves OCR'ing the digitized document to identify text and organizing it into fields that are defined in the template. (More on templates will be presented below.) Any suitable OCR tool (or module), presently available or specifically developed, capable of suitably identifying text layout and format attributes may be employed. Currently available OCR tools are generally flexible enough to conform to needed performance for techniques discussed herein.

OCR modules generally perform text recognition by defining an area within a frame to be converted and then processing it and examining the results. They typically define vector bounding boxes around blocks or sections of text such as individual characters, sentences, lines, paragraphs, etc. The bounding boxes identify text block layout and can also be used to identify format attributes such as font size and the like. For example, when a bounding box indicates the dimensions of a character, its font attributes or even style attributes can be determined directly using the character dimensions, character image mapping, character-to-area ratios, or the like. Other well-known methods can also be used for the OCR module to recognize text format attributes.

OCR programs are usually fairly flexible in allowing designers to adjust software imaging attributes. Varying image attributes may enhance the manner in which the OCR software views text. For example, lowering the software, or display, resolution (e.g., not the scanned resolution) may allow the software to "see" a clearer image of the text thus improving the initial chances of correct recognition. Configuration settings may also be varied based on given design considerations. They can affect the format characteristics of what is being read such as text style (e.g., plain, italic, numeric, image), text size, and font type.

Most OCR software allows the user to set margins of acceptable error when attempting to recognize a text image. Similarly, confidence levels for recognition depending on results of first iterations may be used and adjusted depending upon design considerations. Confidence levels are measures of certainty. Depending upon desired operating performance, different (e.g., two or more) different confidence levels could be used.

Error detection methodologies are also commonly employed. For example, error detection tools include spell checks and automatic corrections based on the software or user specific dictionaries. Various properties such as uppercase words, numeric expressions, roman numerals, proper nouns, math functions, abbreviation and acronyms may also be compared against appropriate more-particular dictionaries. Resolution of patterns involving text and numerals may be varied according to ambiguities dominant in the patterns.

Depending on what type of OCR module is used, the identified text characters may or may not be grouped logically into meaningful blocks for reading to a user. Therefore, a characterization module can be used to further organize the OCR'd text blocks into groups (or blocks) such as sentences, paragraphs, sections, or the like. As discussed more below, the template for the selected document type defines one or more fields, and the text is organized into these fields so that desired target information can be more readily identified and read to a user. Characterization can also be used to link different blocks with one another and to assign hierarchal and other reading-flow attributes to the OCR'd text. For more on characterization, reference may be made to co-pending, commonly owned U.S. patent application entitled: "READING DEVICE WITH HIERARCHAL NAVIGATION," which is hereby incorporated by reference into this application.

In some schemes, depending on attributes and/or attributes defined in the template, the reading device may start scanning (either optically or within the software) at a higher level, i.e., lower resolution to more quickly identify information specified in the template for the field(s) defined in the template. If no (or an insufficient amount) of pertinent information is found, it may increase scan resolution to increase the chance of finding such information. Likewise, when pertinent information is found, it may also increase resolution, if deemed appropriate by the template, to acquire better information in a region that is close to and/or encompassing the found information.

From here, it may perform specified heuristics to confirm that the field(s) identify the sought after target information and to collect any other needed information associated with the target(s). It may also initiate further OCR'ing and/or characterization, especially on information associated with the target, so that it can efficiently be read to the user.

At 207, the routine determines (or confirms) if one or more fields for the selected template were matched (or identified). If not, it proceeds to 209 and notifies the user that no matches were found, and the routine ends. On the other hand, if it is confirmed at 207 that one or more template fields were in fact identified, then it proceeds from there to 208.

At 208, the characterized fields are filtered to identify information for one or more targets, defined in a filter, for reading to a user. In some embodiments, this could be done after field characterization has occurred, or it could be done concurrently with field characterization, depending on particular design considerations. The filtering can occur in any suitable manner and the "filters" may be generated or defined in any suitable way, as well. For example, they could be provided as separate files, loaded into the device and selected upon selection of a document type. Alternatively, they could correspond to input from a user through the user interface. For example, the user could select target(s) from target options presented to the user. A user could also make or acquire its own customized filter, e.g., in file form. In addition, more than one filter could be available for each document type.

At 210, the reading device reads the target information, passed through the filter, to the user. To do this, any suitable text-to-speech (TTS) solution may be used. In some embodiments, the user may be allowed to navigate through the text sequentially or in some other desired way.

FIG. 3 shows an exemplary form for a shortcut template 302 to be used by a read shortcut module, as discussed above to generate text fields, defined by the template, for the document type. The template includes one or more fields 303 ($303_1$ to $303_N$) and a template rules section 305 applicable to the whole template. Each field corresponds to a group of information, having one or more desired targets, that is expected to be in the document type. Through its fields and general rules section, a template describes attributes associated with the different fields that are expected in the document type. For example, for each field, it may describe text box layout and the text box properties that the processor, through characterization discussed previously, is attempting to match against the acquired document to be able to extract some specific "target" information therefrom, e.g. the total amount of a bill for an invoice type document. Field (or text box) properties may include, but are not limited to (1) layout properties (e.g. relative location of text bounding boxes of a nutrition fact label (for a food package document), i.e. upper left corner, or below code bar), (2) content properties (e.g., some specific text such as "nutrition facts" or "total", or an image such as a logo or a bar code), (3) style properties (e.g. a particular font style and size of a title), (4) content type properties (e.g. if a text box contains a number, a proper name, etc), and (5) target properties, which indicate that this text box contains the text to read as a shortcut.

The matching process (block 206 in FIG. 2) compares the template with the input document and calculates matching scores for different sections against the fields defined in the template. This may not be an exact process. If a score for a candidate field section is higher than a predefined threshold for that field, then it is deemed a match, and the text in the section (text box) is identified as such.

The output from this matching (or characterization) process may be a sequence of text prompts to be read along eventually with the content type, e.g. "the total is 25 dollars". Here "total" and "dollar" are content type properties which are read in order to make the output as clear as possible. From here, as discussed above, target information identified in a filter is extracted from the characterized text fields and read to the user.

Figure 4:
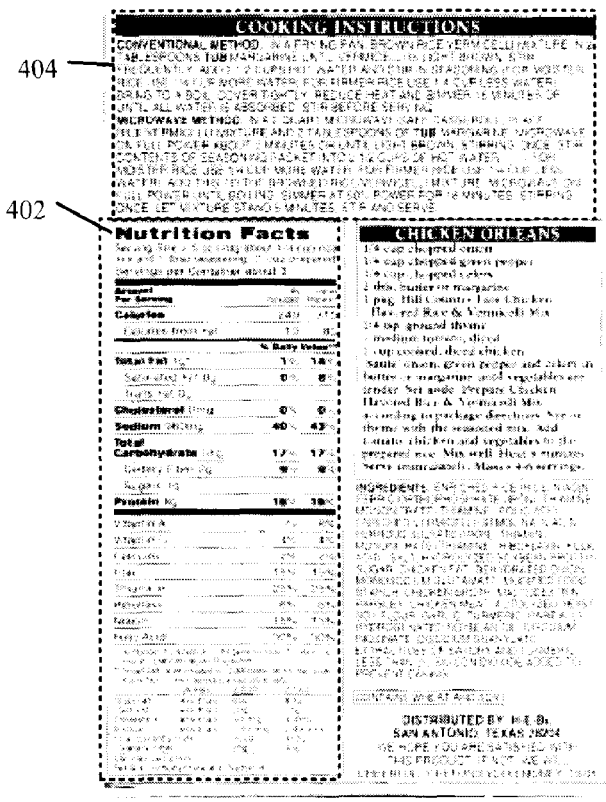
FIG. 4 is an example of a food package document portion showing identified fields.

FIG. 4 shows an exemplary food package label that could be scanned for shortcut reading using the reader of FIG. 1. With this example, assume that the RS module includes a food label template that defines several different fields including "nutritional information" and "preparation instructions" fields. After characterization using the food package template, the processor might identify the nutritional information and bound it using box 402. It would be characterized and identified as a nutritional information field. Likewise, using the preparations instructions field attributes in the template, it might identify the information in box 404 as this field. As with the nutritional information field, it would characterize it so that targets could be extracted and properly be read to a user by way of a filter for the food package document type.

Figure 5:
FIG. 5 is an example of an invoice document portion showing identified fields.

FIG. 5 shows another example, this time an invoice. With this example, assume that, among other things, the template for bills/invoices includes "total amount" and "itemized debits" fields. Using the field attributes, the processor might define the text in 502 and 504 as "total amount" fields and the text in 506 as "itemized debits" fields. In doing this, it might use content properties such as words like: "total", "amount owed", "$", "net", and the like. The rules and/or specified properties could cause the reader (processor) to find one or more of these terms and then confirm, based on specified criterion in the template, that a money amount format (e.g., "X.XX") is found in an acceptable position relative to the found key term(s). It, for example, might also perform comparison and/or arithmetic logic to confirm that it is larger than a sum from the "itemized debits" field. In this example, it found two total amount fields, 502 and 504. It might identify one of them, based on a higher probability score, and then prepare that one for reading to a user.

Figure 6:
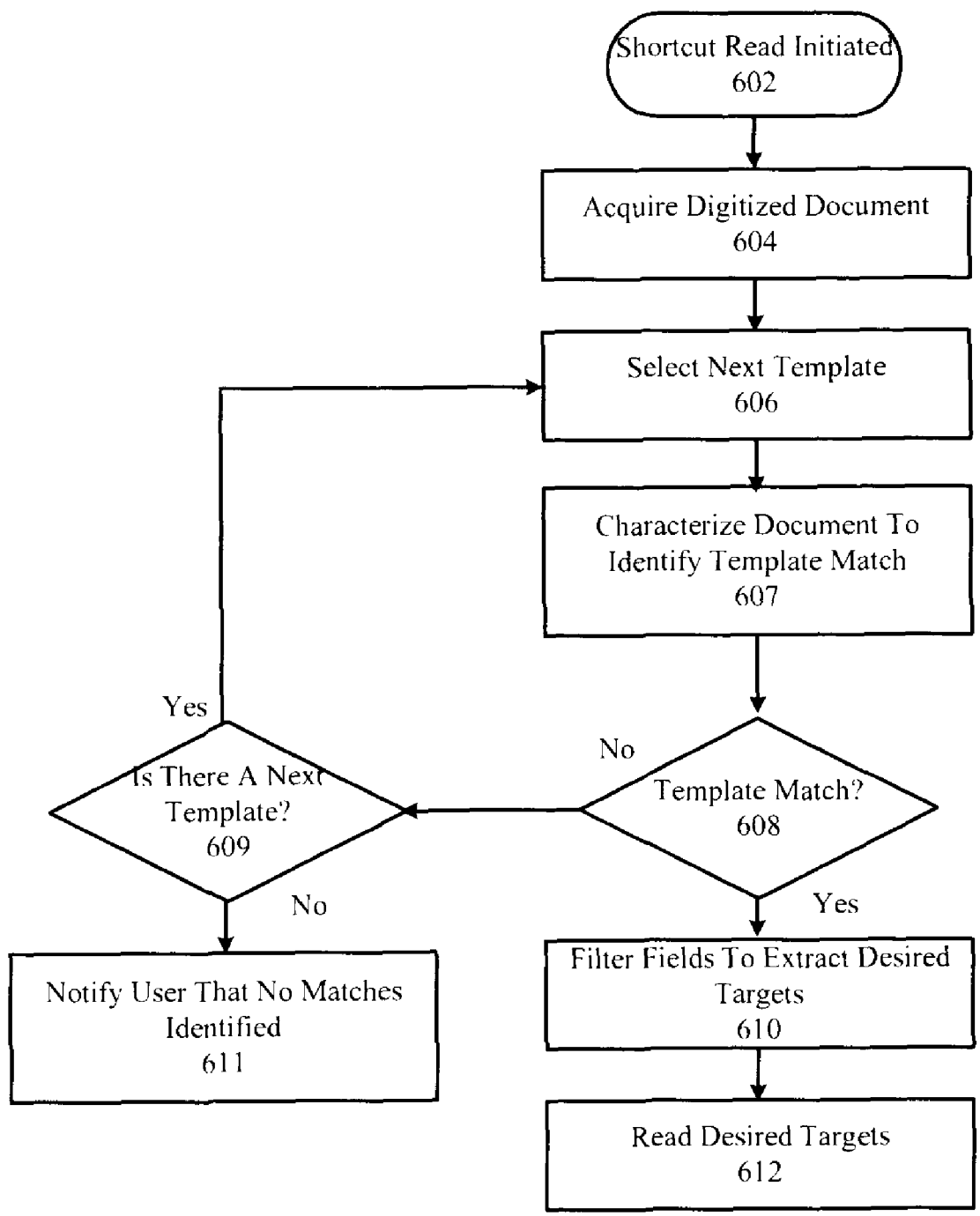
FIG. 6 is a flow diagram of another routine for implementing a shortcut read process in accordance with some embodiments.

FIG. 6 shows a flow diagram for a read shortcut routine in accordance with some alternative embodiments. With this routine, the user is not required to select a particular document type, but rather, the reading device attempts to find a matching template from a plurality of available templates. At 602, a read shortcut operation is initiated. This could correspond to a user simply pressing a read shortcut (or equivalent) button.

At 604, a digitized document to be read is acquired. Next, at 606, the device selects a next template. If it is the first time through, the next template is the first template from the plurality of available templates. At 607, it characterizes the document to determine if it is a match for the selected template. For example, match thresholds could be pre-specified, and the reading device could determine if one or more identified fields, either separately or added together, satisfy the threshold to constitute a match.

If it determines that the selected template was not a match, then it proceeds to 609 and determines if there is a "next" template. If so, it loops back to 606 and continues as described. If, however, at 609, it was determined that there are no more templates, then from there, it goes to 611 and notifies the user that no matches were found.

Returning back to 608, if it was determined that the selected template is in fact a match for the acquired document, then it proceeds to 610 to filter the document and extract target information from the document. From there, it proceeds to 612 and reads the target information to the user.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

The invention is not limited to the embodiments described, but can be practiced with modification and alteration within the spirit and scope of the appended claims.

It should be appreciated that example sizes/models/values/ranges may have been given, although the present invention is not limited to the same. As manufacturing techniques (e.g., photolithography) mature over time, it is expected that devices of smaller size could be manufactured. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. An apparatus, comprising:
    an acquisition device configured to acquire a digitization of at least a portion of a document; and
    at least one processor configured to identify target information in the at least a portion of the document based on a filter, wherein the acquisition device is configured to increase a scan resolution based on an amount of information identified in the acquired digitization of the at least a portion of the document.

2. The apparatus of claim 1, wherein the at least one processor is further configured to characterize text in the document based on a template associated with a type of document associated with the at least a portion of the document, and wherein the template defines one or more content properties, one or more style properties, one or more content type properties, one or more target properties, or any combination thereof of a field in the at least a portion of the document.

3. The apparatus of claim 2, wherein the at least one processor is configured to assign hierarchical attributes to the text being characterized.

4. The apparatus of claim 1, wherein the target information is associated with a document type, and wherein several different document type options are stored on the apparatus.

5. The apparatus of claim 4, wherein the apparatus is configured to receive and store additional document type options.

6. The apparatus of claim 2, wherein the at least one processor is further configured to output the target information in an auditory form without outputting in an auditory form other text from the at least a portion of the document.

7. The apparatus of claim 1, comprising at least one speaker to provide auditory document type options, wherein the target information is dictated by the user's selection of one of the document type options.

8. The apparatus of claim 1, wherein the target information is made available for reading before the whole document portion is made available for reading to the user.

9. A method, comprising:
    acquiring a digital file for at least a portion of a document, the document having the selected document type;
    performing optical character recognition (OCR) on the digital file;
    filtering at least one of the one or more fields to extract target information, wherein the acquiring the digital file comprises scanning the at least a portion of the document with a first scan resolution and scanning the at least a portion of the document with a second scan resolution, wherein the second scan resolution is higher than the first scan resolution.

10. The method of claim 9, wherein acquiring includes imaging the document portion with a camera that is part of a portable reading device.

11. The method of claim 9, comprising searching for one or more key terms associated with the target information.

12. The method of claim 11, wherein the one or more key terms are searched as the optical character recognition is being performed.

13. The method of claim 9, wherein the selected document type is an invoice document type.

14. The method of claim 9, comprising defining a new template based on a document type received from a user.

15. The method of claim 9, wherein outputting the target information includes outputting one or more text prompts derived from the template.

16. A reading device, comprising:
    a user interface configured to receive a read shortcut option and configured to receive a document type;
    a camera configured to scan at least a portion of a document of the selected document type to generate a file; and
    at least one processor configured to process the file to identify target information in the document based on a filter, the target information being associated with the selected document type.

17. The reading device of claim 16, comprising a button in the user interface to activate the read shortcut option.

18. The reading device of claim 16, in which the target information is defined in a template for the selected document type.

19. The reading device of claim 18, wherein the template defines a first field in the document type, the definition including one or more content properties of the first field, one or more style properties of the first field, one or more content type properties of the first field, one or more target properties of the first field, or any combination thereof.

20. The reading device of claim 16, comprising a battery.

21. A method comprising;
receiving a selection of document type;
acquiring a digital file for at least a portion of a document, the document having the selected document type;
performing optical character recognition (OCR) on the digital file;
characterizing text outputted by the OCR performance into one or more fields, the characterizing based on one or more templates;
filtering at least one of the one or more fields to extract target information; and
outputting the target information in an auditory form, wherein the one or more templates define the one or more fields of the selected document type, the definition including one or more content properties of the one or more fields, one or more style properties of the one or more fields, one or more content type properties of the one or more fields, one or more target properties of the one or more fields, or any combination thereof.

22. A reading device, comprising:
a user interface configured to receive a read shortcut option and configured to receive a document type;
a camera configured to scan at least a portion of a document of the selected document type to generate a file, wherein the camera is configured to increase a scanning resolution based on an amount of information identified in the at least a portion of the document.

* * * * *